United States Patent
Lynn et al.

(10) Patent No.: US 11,299,563 B2
(45) Date of Patent: Apr. 12, 2022

(54) CONTROLLING REACTOR SPLIT AND A PRODUCT PARAMETER

(71) Applicant: Univation Technologies, LLC, Houston, TX (US)

(72) Inventors: Timothy R. Lynn, Middlesex, NJ (US); Daniel N. Thomas, Jr., South Charleston, WV (US); Bruce J. Savatsky, Kingwood, TX (US); John F. Szul, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 486 days.

(21) Appl. No.: 16/345,758

(22) PCT Filed: Oct. 25, 2017

(86) PCT No.: PCT/US2017/058225
§ 371 (c)(1),
(2) Date: Apr. 29, 2019

(87) PCT Pub. No.: WO2018/081226
PCT Pub. Date: May 3, 2018

(65) Prior Publication Data
US 2019/0330391 A1   Oct. 31, 2019

Related U.S. Application Data

(60) Provisional application No. 62/414,414, filed on Oct. 28, 2016.

(51) Int. Cl.
*C08F 10/02*       (2006.01)
*C08F 2/34*        (2006.01)
(Continued)

(52) U.S. Cl.
CPC ............... *C08F 10/02* (2013.01); *B01J 8/001* (2013.01); *B01J 8/0492* (2013.01);
(Continued)

(58) Field of Classification Search
USPC ...................... 526/59, 60; 700/269
See application file for complete search history.

(56) References Cited

U.S. PATENT DOCUMENTS 3,356,667 A * 12/1967 Smith .................. B01J 19/0006
526/60
6,225,410 B1   5/2001 Sugimura et al.
(Continued)

FOREIGN PATENT DOCUMENTS

JP   S-5975909    4/1984
WO   2005040226   5/2005

OTHER PUBLICATIONS

International Search Report & Written Opinion for related PCT Application PCT/US2017/058225 dated Jan. 12, 2018 (11 pgs).
(Continued)

*Primary Examiner* — Fred M Teskin
(74) *Attorney, Agent, or Firm* — Brooks, Cameron & Huebsch, PLLC

(57) ABSTRACT

A method including a) polymerizing at least one monomer in a gas phase reactor in the presence of a supported multimodal catalyst system to form a multimodal polyethylene product having a reactor split equal to respective weight fractions of resin components in the polyethylene product; b) applying a predetermined formula for a product parameter of the multimodal polyethylene product; c) obtaining incorporation data and production rate data from the reaction based upon the predetermined formula; d) determining an actual hydrogen leading indicator; e) comparing the actual hydrogen leading indicator to a target value
(Continued)

for a hydrogen leading indicator to determine a deviation of the actual hydrogen leading indicator from the target value; and f) adjusting an amount of a catalyst precursor being fed to the gas phase reactor to control reactor split and a product parameter.

10 Claims, 3 Drawing Sheets

(51) Int. Cl.
     *B01J 8/00*      (2006.01)
     *B01J 8/04*      (2006.01)

(52) U.S. Cl.
     CPC .......... *B01J 2208/00654* (2013.01); *B01J 2208/00725* (2013.01); *C08F 2400/02* (2013.01)

(56) References Cited

U.S. PATENT DOCUMENTS

| | | | |
|---|---|---|---|
| 6,441,096 | B1 | 8/2002 | Baeckman et al. |
| 6,988,022 | B2 | 1/2006 | Parrish et al. |
| 7,838,605 | B2 | 11/2010 | Sandell et al. |
| 9,000,095 | B2 | 4/2015 | Berthold et al. |
| 2004/0242808 | A1* | 12/2004 | Mink .............. C08F 210/16 526/59 |
| 2010/0249355 | A1 | 9/2010 | Davis et al. |

OTHER PUBLICATIONS

International Preliminary Report on Patentability for related PCT Application PCT/US2017/058225 dated May 9, 2019 (7 pgs).

* cited by examiner

CONTROLLING REACTOR SPLIT AND A PRODUCT PARAMETER

This application is a National Stage Application under 35 U.S.C. § 371 of International Application Number PCT/US2017/058225, filed Oct. 25, 2017 and published as WO Publication No. WO 2018/081226 on May 3, 2018, which claims the benefit to U.S. Provisional Application 62/414,414, filed Oct. 28, 2016, the entire contents of which are incorporated herein by reference in its entirety.

FIELD

Embodiments of the disclosure are directed to controlling reactor split and a product parameter, specifically, embodiments are directed to methods and non-transitory computer-readable storage medium to control reactor split and a product parameter based on a product parameter and a hydrogen leading indicator.

BACKGROUND

Catalyst compositions containing single site catalysts, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites. Single site catalysts may produce polyethylene copolymers that have a narrow molecular weight distribution. Although there are single site catalysts that can produce broader molecular weight distributions, polymers produced by these catalysts often show a narrowing of the molecular weight distribution (MWD) as the reaction temperature is increased, for example, to increase production rates. Further, a single site catalyst will often incorporate an amount of comonomer into the molecules of the polyethylene copolymer.

It is generally known in the art that a polyolefin's MWD affects different product attributes. Polymers having a broad molecular weight distribution may have improved physical and/or mechanical properties (e.g., stiffness, processibility, and environmental stress crack resistance (ESCR), etc.). To achieve these properties, multimodal polymers such as bimodal polymers have become increasingly important in the polyolefin industry. Whereas older technology relied on two-reactor systems to generate such material, advances in catalyst design and supporting technology have allowed for the development of single reactor bimetallic catalyst systems capable of producing bimodal high density polyethylene (HDPE). These systems are attractive both from a cost perspective and ease of use. Choice and design of the catalyst system may be used to control these properties.

SUMMARY

Figure 1:
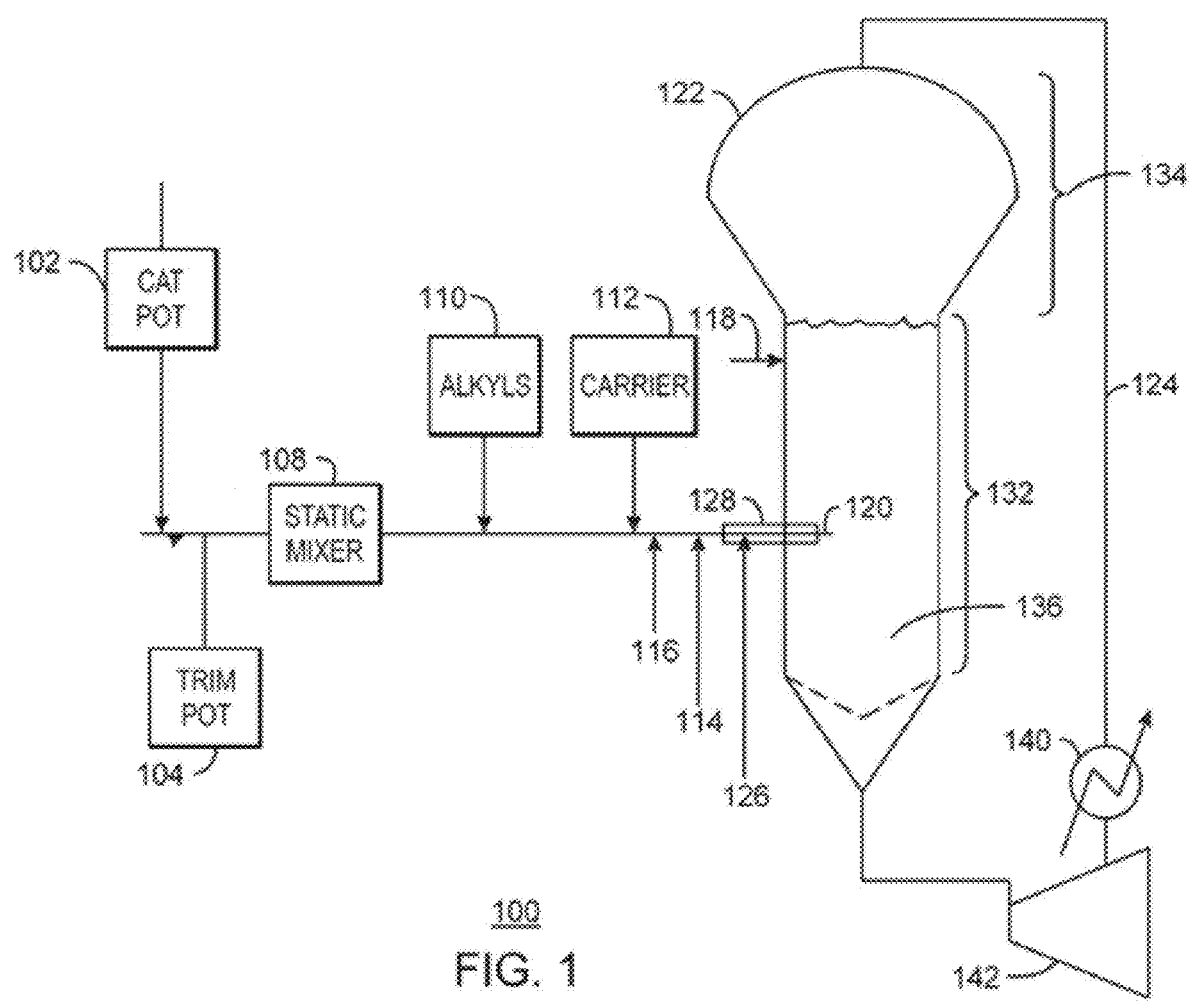
FIG. 1 illustrates a schematic of an example of a gas-phase reactor system suitable for controlling reactor split and a product parameter based on a hydrogen leading indicator in accordance with embodiments described herein.

A method including a) polymerizing at least one monomer in a gas phase reactor in the presence of a supported multimodal catalyst system comprising at least two different catalyst compounds to form a multimodal polyethylene product having a reactor split equal to respective weight fractions of resin components in the polyethylene product; b) applying a predetermined formula for a product parameter of the multimodal polyethylene product; c) obtaining incorporation data and production rate data from the reaction based upon the predetermined formula; d) determining an actual hydrogen leading indicator; e) comparing the actual hydrogen leading indicator to a target value for a hydrogen leading indicator to determine a deviation of the actual hydrogen leading indicator from the target value for the hydrogen leading indicator; and f) adjusting an amount of a catalyst precursor for forming at least one of the two different catalyst compounds and being fed to the gas phase reactor to control reactor split equal to respective weight fractions of resin components in the polyethylene product and the product parameter of the polyethylene product, where the catalyst precursor is activated and forms at least one of the catalyst compounds of the supported catalysts in the gas phase reactor and wherein the adjusted amount of catalyst precursor is based upon data obtained in c) and the deviation determined in e).

A non-transitory computer-readable storage medium comprising instructions when executed by a processor are to perform a) to f), as described above. The above summary of the disclosure is not intended to describe each disclosed embodiment or every implementation of the disclosure.

DETAILED DESCRIPTION

Methods and non-transitory computer-readable storage medium for controlling reactor split and a product parameter based on a hydrogen leading indicator are described herein. As used herein, reactor split refers to respective weight fractions of a particular resin component in multi-modal resins produced by multiple catalysts in polymerization reactors (e.g. multimodal resins produced together in a single-stage gas-phase reactor). Control of reactor split and similarly a product parameter (e.g., flow index) may be desirable to control of resin properties and/or maintain desired product properties of products from the resin.

In an effort to control reactor split and/or a product parameter some approaches may periodically analyze resin produced from a reactor. That is, the product characteristics of bimodal resins (or other multi-modal resins) that are produced by more than one catalyst are dependent of the distribution of the molecular species. Where more than one catalyst and one or more monomer(s) are used to produce a polymeric product (e.g. the product being a mixture of different homopolymers/and co- or terpolymers) precise control of the multiple polymerization reactions in the reactor is required for repeatability in producing products. The reactor can be controlled based on the results of the periodic analysis. However, such approaches may undesirably provide a measurement of a cumulative reactor split.

A cumulative reactor split refers to a time average of the product produced as sampled from a reactor. Further, while the analytical approach for obtaining actual split data may be performed using different analytical techniques, for example GPC or SEC (gel permeation or size exclusion molar mass or molecular weight measurements), they are highly dependent on resin sampling, sample preparation, the generation of the data and the reduction of the data into an estimate of the fraction of each polymer in the product (e.g. SEC data may be deconvoluted and the individual molecular weight distributions estimated). Because the time to determine reactor split (or a product parameter) using this process may be several hours (between the actual polymerization and the analysis of reactor split), the data have reduced utility once ultimately determined even when the sampling, measurement and data interpretation are accurate and precise. Additionally, the SEC (size exclusion chromatography) measurement may be cost intensive and/or prone to error.

Some approaches may attempt to control reactor split and/or a product parameter based on inferences made from an amount of hydrogen exiting a reactor and/or an incorporation of hydrogen. For instance, some approaches such as those in U.S. Pat. No. 6,988,022 (Parrish et al.), may attempt to control reactor split based on an amount of hydrogen exiting a reactor and the assumption of the existence of a linear relationship between instantaneous reactor split and the incorporation rate of a particular monomer or reactant. However, in practice, such a linear relationship may not exist for at least some periods of time during operation of a reactor. As such, approaches that attempt to control reactor split by relying on such a theoretical linear relationship may not provide a sufficient level of control of reactor split. Accordingly, the present inventors appreciated a need for improvements in mixed catalyst continuous polymerization process control of reactor split and a product parameter.

The term "bimodal," when used herein to describe a polymer or polymer composition, e.g., polyethylene, means "bimodal molecular weight distribution. Bimodal polymers refer to polymers produced using two or more different catalyst types or two or more different reactor environments, such that the resultant polymers have a bimodal molecular weight distribution including a low molecular weight component and a high molecular weight component (having a comparatively high molecular weight and/or range of molecular weights than the low molecular weight component). For example, a composition that includes a polyethylene component with at least one identifiable higher molecular weight and a polyethylene component with at least one identifiable lower molecular weight, e.g., two peaks in a composition scan, is considered to be a "bimodal" polyethylene, as that term is used herein. In some embodiments, a bimodal polyethylene consists essentially of two peaks in a composition scan, in contrast to other distractions that may have more or less peaks in a composition scan. A "multimodal" composition refers to a composition including two or more MWD distribution, e.g., a bimodal, a trimodal or even tetramodal, etc. composition.

Various different types of processes, and reactor configurations, can be used to produce a bimodal polyethylene composition, including melt blending, series reactors (i.e., sequentially-configured reactors) and single reactors using bimetallic catalyst systems. Any polyethylene composition regarded as a "multi-modal" composition in U.S. Pat. No. 6,579,922 is considered to fall within the broad meaning of the term "bimodal polyethylene composition" herein, although important differences exist between the bimodal compositions claimed herein and the bimodal compositions disclosed in that patent. Thus, for example, one embodiment of bimodal composition is a reactor blend (also sometimes referred to as a chemical blend), is one that is formed (polymerized) in a single reactor, e.g., using a bimodal catalyst system (e.g., a dual site catalyst) while at least one other embodiment of a bimodal composition is a physical blend, e.g., a composition formed by the post-polymerization blending or mixing together of two unimodal polyethylene compositions.

"Incorporation" or "Incorporation rate" means the amount of any monomer or reactant or other additive incorporated into a polymer product or composition per unit time and is a rate function. Incorporation may also be defined as the amount of a monomer or reactant that has been incorporated into the molecular structure of a polymer. Incorporation may also be defined as the flow rate of a monomer or other reactant into a reactor minus the flow rate of that reactant that escapes the reactor not incorporated into a polymerization product or resin. For example, in the case of a gas phase polymerization reactor, the incorporation is the flow rate of a reactant into the reactor minus the amount of the reactant that escapes through the reactor vent, minus the amount of the reactant that escapes dissolved (but unreacted) in the polymer product or in the void spaces between polymer particles exiting the reactor minus the flux or in monomer or reactant per unit time in the reactor (i.e. dm/dt). The quantities of monomers or reactants may be measured with devices like mass flow meters or chromatographs, or other measuring devices so long as they are capable of yielding information that can be used to determine, alone or with suitable calibration or standards, quantities of reactants or monomers. Other devices useful for determining incorporation include thermometers, thermocouples, thermostats and the like-such devices may provide information to calculate incorporation on a thermodynamic, kinetic or material balance basis: all of these devices and known useful scientific methods may be used in conjunction with programmable reaction controllers (e.g. programmable digital computers) in a systematic, cooperative fashion to provide so-called real-time information regarding incorporation or incorporation rates of material components useful in the methods of the present invention. "Periodic" refers to any fixed or variable time period of measurement of data or continuous measurement of data.

"Hydrogen leading indicator" such as an actual hydrogen leading indicator and/or a target value for a hydrogen leading indicator means an amount of hydrogen present relative to an amount of a monomer in re-circulated gases and/or feed gases. For instance, in some embodiments, a hydrogen leading indicator (e.g., an actual hydrogen leading indicator) can be represented by a H2/C2 flow ratio in feed gases and/or in re-circulated gases. In some embodiments, the hydrogen leading indicator can be represented by a H2/C2 flow ratio in feed gases and/or in re-circulated gases divided by the H2/C2 molar composition ratio. A value of an actual hydrogen leading indicator can be equal to a single measurement of hydrogen or an average of a plurality of measurements (i.e., smoothed or filtered) of hydrogen.

"Resin" means the product of a polymerization reaction and may be used synonymously with the term "polymer" or "polymer product" or "polymerization product" or "polymer composition".

"Instantaneous split" as detailed in U.S. Pat. No. 6,988,022 means the ratio of the fraction (mass or weight) of one component of a bimodal or multimodal polymerization to the sum of all components present at a particular time in a polymerization. For example, when a relatively higher molecular weight and another relatively lower molecular weight polymer are present the instantaneous split can be expressed as (e.g.—for the higher molecular weight component):

$$S = P_R^{HMw}/(P_R^{LMW} + P_R^{HMW})$$ (Equation 1)

where S is the instantaneous split, $P_R^{HMW}$ is the high molecular weight component's production rate, and $P_R^{LMW}$ is the low molecular weight component's production rate.

"Production rate" is the time rate of production of a polymer product and may be measured as pounds per hour(lbs./hr) or tons per hour(t/hr). Production rate is also the summation of all the incorporations of all reactants and monomers that react to form a polymer composition at a particular time. Values for the production rate may be obtained from reactor heat balance and reaction mass balance data or other reactor data in a similar manner as incorporation is determined.

"Reactor split" means the weight fraction of a particular resin component in multi-modal resins produced by multiple catalysts in a polymerization reactor (e.g. a single-stage gas-phase reactor).

"Predetermined formula" means a non-linear relationship or mathematical equation relating the ratio of a monomer or reactant incorporation rate to a corresponding reactor production rate and the corresponding reactor split for a bi- or multimodal polymerization reaction. "Non-linear" means the output of the equation (FI) is not directly proportional to the inputs. As mentioned, this being 'non-linear' contrasts with other approaches that may rely on a theoretical linear relation. The predetermined non-linear equation can be expressed as:

$$\text{Flow Index} = e^{\{A + C[H2_{mol}:C2_{mol}] + D[C6_{mol}:C2_{mol}] + E(ICA_{pp})\}} * (HMW_{mol}:LMW_{mol})^B$$ (Equation 2)

where the variables include A as the intercept determined from the best fit line, and B, C, D, and E are slope terms determined from the best fit line, $H2_{mol}:C2_{mol}$ is the molar ratio of hydrogen to ethylene, $C6_{mol}:C2_{mol}$ is the molar ratio of hexene to ethylene, ICApp is the induced condensing agent partial pressure, and $HMW_{mol}: LMW_{mol}$ is the molar ratio of the high molecular weight fraction to the low molecular weight fraction.

Each of the variables included in Equation 2 can be measured directly from the gas phase reactor and/or streams entering or leaving the gas phase reactor and/or determined by periodically analyzing resin produced from a reactor. Each of the variables included in Equation 2 can be a single measurement or an average of a plurality of measurements (i.e., smoothed or filtered). In some embodiments, the variable A can be considered an "update constant" which can be adjusted in various manners, for example, based on laboratory flow index data. That is, the "update" constant can enable adjustment of the flow index determined from Equation 2 to align/more closely align with flow index measured in a laboratory. Equation 2 can provide a baseline control that can be supplemented with control based on the hydrogen leading indicator as described herein.

The term "multimodal catalyst system" includes any composition, mixture or system that includes at least two different catalyst compounds, each having the same or a different metal group but generally different ligands or catalyst structure, including a "dual catalyst." Alternatively, each different catalyst compound of the multimodal catalyst system can reside on a single support particle, e.g., in which case a dual catalyst is considered to be a supported catalyst. However, the term multimodal catalyst system also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the two collections of supported catalysts. In some instances, "multimodal catalyst system" can include single structures incorporating multiple metal sites in the same ligand that are both catalytically active during polymerization and that produce a bimodal resin. Alternatively, the multimodal catalyst system can include a mixture including at least one unsupported catalyst precursor compound in slurry form. For instance, the at least one unsupported catalyst precursor compound can be provided via a trim pot, as described herein.

"Trim catalyst/catalyst feed ratio" or "trim catalyst/base catalyst feed ratio" means a total weight of trim catalyst provided from a catalyst pot relative to a total amount of base catalyst provided from a catalyst pot to the reactor. For instance, one or more catalyst pots can be coupled to a gas phase reactor to provide a trim catalyst to the reactor.

Gas Phase Reactor (i.e., Gas Phase Polymerization Reactor)

FIG. 1 illustrates a schematic of an example of a gas-phase reactor system 100 suitable for controlling reactor split and a product parameter based on a hydrogen leading indicator in accordance with embodiments described herein. The catalyst component slurry such as those of preferably a mineral oil slurry including at least one support and at least one activator, at least one supported activator, and optional catalyst compounds may be placed in a vessel or catalyst pot (cat pot) 102. In one embodiment, the cat pot 102 is an agitated holding tank designed to keep the solids concentration homogenous. In some embodiments, the cat pot 102 can include a supported catalyst. The supported catalyst can be a metallocene catalyst compound and/or a Group 15 metal-containing compound such as those compounds described herein.

A catalyst component solution, prepared by mixing a solvent and at least one catalyst compound (e.g., non-metallocene catalyst and/or zirconocene catalyst) and/or activator, is placed in another vessel, which can be termed a trim pot 104. However, it is noted that in at least some embodiments, the trim pot 104 can include a catalyst precursor, as described herein. As used herein, the catalyst precursor refers to an unsupported catalyst precursor compound.

In any case, the catalyst component slurry can then be combined in-line with the catalyst component solution to form a final catalyst composition (i.e., a catalyst system). The catalyst system comprises two of more of (pentamethylcyclopentadienyl)(propylcyclopentadienyl)$MX_2$, (tetramethylcyclopentadienyl)(propylcyclopentadienyl)$MX_2$, (tetramethylcyclopentadienyl)(butylcyclopentadienyl)$MX_2$, $Me_2Si(indenyl)_2MX_2$, $Me_2Si(tetrahydroindenyl)_2MX_2$, (n-propyl cyclopentadienyl)$_2MX_2$, (n-butyl cyclopentadienyl)$_2MX_2$, (1-methyl, 3-butyl cyclopentadienyl)$_2MX_2$, $HN(CH_2CH_2N(2,4,6-Me_3phenyl))_2MX_2$, $H N(CH_2CH_2N (2,3,4,5,6-Me_5phenyl))_2MX_2$, (propyl cyclopentadienyl) (tetramethylcyclopentadienyl)$MX_2$, (butyl cyclopentadienyl)$_2MX_2$, and (propyl cyclopentadienyl)$_2MX_2$, where M is zirconium or hafnium, and X is selected from F, Cl, Br, I, Me, benzyl, $CH_2SiMe_3$, and $C_2$ to $C_5$ alkyls and $C_2$ to $C_5$ alkenyls.

A nucleating agent such as silica, alumina, fumed silica or any other particulate matter may be added to the slurry and/or the solution in-line or in the vessels 102 or 104.

Similarly, additional activators or catalyst compounds may be added in-line. For example, a second catalyst slurry that includes a different catalyst may be introduced from a second cat pot. The two catalyst slurries may be used as the catalyst system with or without the addition of a solution catalyst from the trim pot.

The catalyst component slurry and solution can be mixed in-line, among other possibilities. For example, the solution and slurry may be mixed by utilizing a static mixer 108 or an agitating vessel (not shown). The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 1 to about 60 minutes, about 5 to about 40 minutes, or about 10 to about 30 minutes.

In an embodiment, an aluminum alkyl, an ethoxylated aluminum alkyl, an aluminoxane, an anti-static agent or a borate activator, such as a C1 to C15 alkyl aluminum (for example tri-isobutyl aluminum, trimethyl aluminum or the like), a C1 to C15 ethoxylated alkyl aluminum or methyl aluminoxane, ethyl aluminoxane, isobutylaluminoxane, modified aluminoxane or the like are added to the mixture of the slurry and the solution in line. The alkyls, antistatic agents, borate activators and/or aluminoxanes may be added from an alkyl vessel 110 directly to the combination of the solution and the slurry, or may be added via an additional alkane (such as isopentane, hexane, heptane, and or octane) carrier stream, for example, from a carrier vessel (i.e., hydrocarbon vessel) 112. The additional alkyls, antistatic agents, borate activators and/or aluminoxanes may be present at up to about 500 ppm, at about 1 to about 300 ppm, at 10 to about 300 ppm, or at about 10 to about 100 ppm. Carrier streams that may be used include isopentane and or hexane, among others. The carrier may be added to the mixture of the slurry and the solution, typically at a rate of about 0.5 to about 60 lbs/hr (27 kg/hr). Likewise, a carrier gas 114, such as nitrogen, argon, ethane, propane, and the like, may be added in-line to the mixture of the slurry and the solution. Typically, the carrier gas may be added at the rate of about 1 to about 100 lb/hr (0.4 to 45 kg/hr), or about 1 to about 50 lb/hr (5 to 23 kg/hr), or about 1 to about 25 lb/hr (0.4 to 11 kg/hr).

In another embodiment, a liquid carrier stream is introduced into the combination of the solution and slurry that is moving in a downward direction. The mixture of the solution, the slurry and the liquid carrier stream may pass through a mixer or length of tube for mixing before being contacted with a gaseous carrier stream.

Similarly, a comonomer 116, such as hexene, another alpha-olefin, or diolefin, may be added in-line to the mixture of the slurry and the solution. The slurry/solution mixture is then passed through an injection tube 120 to a gas phase polymerization reactor 122. In some embodiments, the injection tube may aerosolize the slurry/solution mixture. Any number of suitable tubing sizes and configurations may be used to aerosolize and/or inject the slurry/solution mixture.

In one embodiment, a gas stream 126, such as cycle gas, or re-cycle gas 124, monomer, nitrogen, or other materials is introduced into a support tube 128 that surrounds the injection tube 120. To assist in proper formation of particles in the reactor 122, a nucleating agent 118, such as fumed silica, can be added directly into the reactor 122.

When a metallocene catalyst or other similar catalyst is used in the gas phase reactor, oxygen or fluorobenzene can be added to the reactor 122 directly or to the gas stream 126 to control the polymerization rate. Thus, when the zirconocene catalyst (which is sensitive to oxygen or fluorobenzene) is used in combination with another catalyst (that is not sensitive to oxygen) in a gas phase reactor, oxygen can be used to modify the zirconocene polymerization rate relative to the polymerization rate of the other catalyst. The addition of water or carbon dioxide to gas phase polymerization reactors, for example, may be applicable for similar purposes. In one embodiment, the contact temperature of the slurry and the solution is in the range of from 0° C. to about 80° C., from about 0° C. to about 60° C., from about 10° C., to about 50° C., and from about 20° C. to about 40° C.

Additional solutions and slurries may be included. For example, a slurry can be combined with two or more solutions having the same or different catalyst compounds and or activators. Likewise, the solution may be combined with two or more slurries each having the same or different supports, and the same or different catalyst compounds and or activators. Similarly, two or more slurries combined with two or more solutions, preferably in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, are each independently combined, in-line, with the slurry.

Moreover, as mentioned an amount of a catalyst precursor can, in some embodiments, be employed in the cat pot 102. The amount of the catalyst precursor can be adjusted (relative to an initial catalyst precursor feed rate and/or amount) by increasing or decreasing the amount of the catalyst precursor such that the adjusted amount of catalyst precursor is provided to the reactor 122 without exposing the catalyst precursor to an activator until the catalyst precursor is within a volume of the reactor. In such embodiments, the catalyst precursor can be activated by contacting the catalyst precursor with methylaluminoxane in the gas phase reactor 122.

Use of Catalyst Composition to Control Product Properties

As described in embodiments herein, appropriate selection of the catalysts and ratios may be used to adjust the MWD, short chain branch distribution (SCBD), and long-chain branch distribution (LCBD) of the polymer, for example, to provide a polymer with a broad orthogonal composition distribution (BOCD). The MWD, SCBD, and LCBDs would be controlled by combining catalysts with the appropriate weight average molecular weight (Mw), comonomer incorporation, and long chain branching (LCB) formation under the conditions of the polymerization. For instance, the weight average molecular weight of the low molecular weight polyethylene component can be from 5,000 to 35,000 grams/mole (g/mol) and/or the weight average molecular weight of the high molecular weight polyethylene component is from 400,000 to 700,000 g/mol. However, other values are possible depending upon an intended application, etc.

Employing multiple pre-catalysts that are co-supported on a single support mixed with an activator, such as a silica methylaluminoxane (SMAO), can provide a cost advantage by making the product in one reactor instead of multiple reactors. Further, using a single support also facilitates intimate mixing of the polymers and offers improved operability relative to preparing a mixture of polymers of different Mw and density independently from multiple catalysts in a single reactor. As used herein, a pre-catalyst is a catalyst compound prior to exposure to activator.

The density of a polyethylene copolymer provides an indication of the incorporation of comonomer into a polymer, with lower densities indicating higher incorporation. The expected difference in the densities of the low molecular weight (LMW) component and the high molecular weight (HMW) component can be greater than about 0.02, or greater than about 0.04, with the HMW component having a lower density than the LMW component. These factors can be adjusted by controlling the molecular weight distribution (MWD) and SCBD, which, in turn, can be adjusted by changing the relative amount of the two pre-catalysts on the support. This may be adjusted during the formation of the pre-catalysts, for example, by supporting two catalysts on a single support. The relative amounts of the pre-catalysts can be adjusted by adding one of the components to a catalyst mixture such as a bimodal polymerization catalyst system en-route to the reactor in a process termed "trim". Feedback of polymer property data can be used to control the amount of catalyst addition. Metallocenes (MCNs) such as zirconocenes are known to trim well with other catalysts.

The properties of the product polymer may be controlled by adjusting the timing, temperature, concentrations, and sequence of the mixing of the solution, the slurry and any optional added materials (nucleating agents, catalyst compounds, activators, etc.) described above. The MWD, melt index, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, changing the amount of the second catalyst in the polymerization system. Other process parameters that can be adjusted include changing the relative ratio of the catalyst in the polymerization process (and optionally adjusting their individual feed rates to maintain a steady or constant polymer production rate). The concentrations of reactants in the reactor 122 can be adjusted by changing the amount of liquid or gas that is withdrawn or purged from the process, changing the amount and/or composition of a recovered liquid and/or recovered gas returned to the polymerization process, where the recovered liquid or recovered gas can be recovered from polymer discharged from the polymerization process. Further concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted, such as changing the relative feed rates of the slurry or solution, changing the mixing time, the temperature and or degree of mixing of the slurry and the solution in-line, adding different types of activator compounds to the polymerization process, and adding oxygen or fluorobenzene or other catalyst poison to the polymerization process. Any combinations of these adjustments may be used to control the properties of the final polymer product.

In one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In one embodiment, a polymer product parameter is measured in-line and in response the ratio of the catalysts being combined is altered. In one embodiment, the molar ratio of the catalyst compound in the catalyst component slurry to the catalyst compound in the catalyst component solution, after the slurry and solution have been mixed to form the final catalyst composition, is 500:1 to 1:500, or 100:1 to 1:100, or 50:1 to 1:50 or 40:1 to 1:10. In another embodiment, the molar ratio of a non-metallocene catalyst compound in the slurry to a zirconocene catalyst compound in the solution, after the slurry and solution have been mixed to form the catalyst composition, is 500:1, 100:1, 50:1, 10:1, or 5:1. In another embodiment, when the ratio of the catalyst compounds is altered, the introduction rate of the catalyst composition to the reactor, or other process parameters, is altered to maintain a desired production rate.

Polymerization Process

The polymerization catalysts, as described herein, can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 1 can be used. For example, a trim system may be used to feed catalyst to a loop slurry reactor for polyethylene copolymer production.

The terms "polyethylene" and "polyethylene copolymer" refer to a polymer having at least 50 weight percent (wt. %) ethylene-derived units. The polyethylene can have at least 70 wt. % ethylene-derived units, at least 80 wt. % ethylene-derived units, at least 90 wt. % ethylene-derived units, or at least 95 wt. % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 1, the fluidized bed reactor 122 can include a reaction zone 132 and a velocity reduction zone 134. The reaction zone 132 can include a bed 136 that includes growing polymer particles, formed polymer particles and a minor amount of catalyst particles fluidized by the continuous flow of the gaseous monomer and diluent to remove heat of polymerization through the reaction zone. Optionally, some of the re-circulated gases 124 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 132 can be passed to the velocity reduction zone 134 where entrained particles are removed, for example, by slowing and falling back to the reaction zone 132. If desired, finer entrained particles and dust can be removed in a separation system such as a cyclone and/or fines filter.

A gas analyzer (not illustrated) can be used to sample the re-circulated gases 124 (i.e., the recycle gas stream) to determine concentrations of various components in the recycle gas stream. That is, the gaseous reaction mixture leaving the top of the reactor 122, termed the "recycle gas stream," contains principally unreacted monomer, unreacted comonomer, unreacted hydrogen gas, inert condensable gases such as isopentane, and/or inert non-condensable gases such as nitrogen. An amount of hydrogen present in the re-circulated gases 124 can be measured. Based on the same, an actual hydrogen leading indicator, as described herein, can be determined. Examples of suitable gas analyzers include a gas phase chromatograph (GC), or a spectrograph such as a near-infrared spectrometer(N) or a Fourier transform near-infrared spectrometer (FT-NIR).

The gas 124 can be passed through a heat exchanger 140 where at least a portion of the heat of polymerization can be removed. The gas can then be compressed in a compressor 142 and returned to the reaction zone 132.

The reactor temperature of the fluid bed process can be greater than about 30° C., about 40° C., about 50° C., about 90° C., about 100° C., about 110° C., about 120° C., about 150° C., or higher. In general, the reactor temperature is operated at the highest feasible temperature taking into account the sintering temperature of the polymer product within the reactor. Thus, the upper temperature limit in one embodiment is the melting temperature of the polyethylene copolymer produced in the reactor. However, higher temperatures may result in narrower MWDs, which can be improved by the addition of other co-catalysts, as described herein. Alternatively, the reactor temperature may be further limited to provide maintain desired product properties (such as ESCR and melt strength).

Hydrogen gas can be used in olefin polymerization to control the final properties of the polyolefin, such as described in the "Polypropylene Handbook," at pages 76-78 (Hanser Publishers, 1996). Using certain catalyst systems, increasing concentrations (partial pressures) of hydrogen can increase the flow index (FI), or melt index (MI) of the polyethylene copolymer generated. The flow index can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be an amount necessary to achieve the desired flow index of the final polyolefin polymer. For example, the mole ratio of hydrogen to total monomer (H2:monomer) can be greater than about 0.0001, greater than about 0.0005, or greater than about 0.001. Further, the mole ratio of hydrogen to total monomer (H2:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 5,000 ppm, up to about 4,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppm, or about 100 ppm to a high of about 400 ppm, about 800 ppm, about 1,000 ppm, about 1,500 ppm, or about 2,000 ppm, based on weight. Further, the ratio of hydrogen to total monomer (H2:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 45,500 kg/hr (100,000 lbs/hr).

A slurry polymerization process can also be used in embodiments. A slurry polymerization process generally uses pressures in the range of from about 101 kPa (1 atmosphere) to about 5,070 kPa (50 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed. The slurry can be circulated in a continuous loop system.

In various embodiments, the multimodal catalyst system can be a bimodal catalyst system including a metallocene catalyst such as a zirconocene catalyst and a non-metallocene catalyst. In a preferred embodiment, at least two catalysts are a combination of a metallocene catalyst and a non-metallocene single site catalyst that will produce a mixture of relatively higher and relatively lower molecular weight polymers admixed.

Metallocene Catalysts

Metallocene catalyst compounds can include "half sandwich" and/or "full sandwich" compounds having one or more Cp ligands (e.g., cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

"Catalyst compound" includes any compound that, once appropriately activated, is capable of catalyzing the polymerization or oligomerization of olefins.

Non-Metallocene Catalysts

The non-metallocene olefin polymerization catalyst may be a Group 15 metal-containing catalyst compound. That is, the bimodal polymerization catalyst system can include one or more Group 15 metal-containing catalyst compounds. As used herein, these are termed non-metallocene olefin polymerization catalyst compounds. The Group 15 metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a 01 to C20 hydrocarbon group, a heteroatom containing group, silicon, germanium, tin, lead, or phosphorus, where the Group 15 or 16 atom may also be bound to nothing or a hydrogen, a Group 14 atom containing group, a halogen, or a heteroatom containing group, and where each of the two Group 15 atoms are also bound to a cyclic group and can optionally be bound to hydrogen, a halogen, a heteroatom or a hydrocarbyl group, or a heteroatom containing group.

Catalyst Forms

The bimodal polymerization catalyst system may include a catalyst component in a slurry, which may have an initial catalyst compound, and an added solution catalyst component that is added to the slurry. Generally, a non-metallocene olefin polymerization catalyst will be supported in the initial slurry, depending on solubility. However, in some embodiments, the initial catalyst component slurry may have no catalysts but may have an activator or support. In this case, two or more solution catalysts may be added to the slurry to cause each to be supported.

Any number of combinations of catalyst components may be used in embodiments. For example, the catalyst component slurry can include an activator and a support, or a supported activator. Further, the slurry can include a catalyst compound in addition to the activator and the support. As noted, the catalyst compound in the slurry may be supported.

The slurry may include one or more activators and supports, and one more catalyst compounds. For example, the slurry may include two or more activators (such as alumoxane and a modified alumoxane) and a catalyst compound, or the slurry may include a supported activator and more than one catalyst compounds. In one embodiment, the slurry includes a support, an activator, and two catalyst compounds. In another embodiment the slurry includes a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, or 150:1 to 1:1. The slurry can include a support material which may be any inert particulate carrier material known in the art, including, but not limited to, silica, fumed silica, alumina, clay, talc or other support materials such as disclosed above. In one embodiment, the slurry contains silica and an activator, such as methyl aluminoxane ("MAO"), modified methyl aluminoxane ("MMAO").

One or more diluents or carriers can be used to facilitate the combination of any two or more components of the catalyst system in the slurry or in the trim catalyst solution. For example, the single site catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst mixture or the catalyst/activator mixture can be added to the support.

The catalyst is not limited to a slurry arrangement, as a mixed catalyst system may be made on a support and dried. The dried catalyst system can then be fed to the reactor through a dry feed system.

Support

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. The single site catalyst compounds of the slurry can be spray dried. The support used with the single site catalyst compound can be functionalized, or at least one substituent or leaving group is selected. The support material may be any of the conventional support materials.

Preferably the supported material is a porous support material, for example, talc, an inorganic oxide, or an inorganic chloride. Other support materials include resinous support materials (e.g., polystyrene), functionalized or crosslinked organic supports, such as polystyrene divinyl benzene polyolefins or polymeric compounds, zeolites, clays, or any other organic or inorganic support material and the like, or mixtures thereof. The support materials may be treated chemically, for example with a fluoride compound as described in WO 00/12565. Other supported activators are described in for example WO 00/13792 that refers to supported boron containing solid acid complex.

In a method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator. Procedures for measuring the total pore volume of a porous support are well known in the art Activator As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst".

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be oligomeric aluminum compounds having —Al(R)—O— subunits, where R is an alkyl group. Examples of aluminoxanes include, but are not limited to MAO, MMAO, ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage.

One or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Catalyst Component Solution

The catalyst component solution may include only a catalyst compound, such as a zirconocene, or may include an activator in addition to the catalyst compound. The catalyst solution used in the trim process can be prepared by dissolving the catalyst compound and optional activators in a liquid solvent. The liquid solvent may be an alkane, such as a C5 to C30 alkane, or a C5 to C10 alkane. Cyclic alkanes such as cyclohexane and aromatic compounds such as toluene may also be used. In addition, mineral oil may be used as a solvent. The solution employed should be liquid under the feed conditions to the polymerization reactor, and relatively inert. In one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. The activator and catalyst compound can be present in the solution at up to about 90 wt. %, at up to about 50 wt. %, at up to about 20 wt. %, up to about 10 wt. %, at up to about 5 wt. %, at less than 1 wt. %, or between 100 ppm and 1 wt. %, based upon the weight of the solvent and the activator or catalyst compound.

The catalyst component solution can comprises any one of the soluble catalyst compounds described in the catalyst section herein. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

The aforementioned control agents and other control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula: —$(CH_2$—$CH_2$—$NH)_n$—, in which n may be from about 10 to about 10,000. The polyethyleneimines may be linear, branched, or hyperbranched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —[CH2-CH2-NH]— may be used as the polyethyleneimine, materials having primary, secondary, and tertiary branches can also be used. Commercial polyethyleneimine can be a compound having branches of the ethyleneimine polymer.

Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %. Other static control agents and additives are applicable.

The continuity additive(s) or static control agent(s) may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

The product polyethylene can have a melt index ratio (MIR or I21/I2) ranging from about 10 to less than about 300, or, in many embodiments, from about 15 to about 150. Flow index (FI, HLMI, or I21 can be measured in accordance with ASTM D1238 (190° C., 21.6 kg). The melt index (MI, I2) can be measured in accordance with ASTM D1238 (at 190° C., 2.16 kg weight). The melt index (MI, I5) can be measured in accordance with ASTM D1238 (190° C., 5 kg). Another melt index (MI, I21) can be measured in accordance with ASTM D1238 (190° C., 21.6 kg).

Density can be determined in accordance with ASTM D-792. Density is expressed as grams per cubic centimeter (g/cm3) unless otherwise noted. The polyethylene can have a density ranging from a low of about 0.89 g/cm3, about 0.90 g/cm3, or about 0.91 g/cm3 to a high of about 0.95 g/cm3, about 0.96 g/cm3, or about 0.97 g/cm3. The polyethylene can have a bulk density, measured in accordance with ASTM D1895 method B, of from about 0.25 g/cm3 to about 0.5 g/cm3. For example, the bulk density of the polyethylene can range from a low of about 0.30 g/cm3, about 0.32 g/cm3, or about 0.33 g/cm3 to a high of about 0.40 g/cm3, about 0.44 g/cm3, or about 0.48 g/cm3. In some embodiments, the bimodal polyethylene composition can have a density of 0.940 gram/cubic centimeters or more.

The polyethylene (e.g., a HDPE) can be suitable for such articles as films, fibers, nonwoven and/or woven fabrics, extruded articles, and/or molded articles. Examples of films include blown or cast films formed in single layer extrusion, coextrusion, or lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions by injection molding or rotation molding or blow molding processes in the form of bottles, tanks, large hollow articles, rigid food containers and toys, etc.

EXAMPLES

Sample Catalyst Preparation

Components and amounts in the sample catalyst preparation process below were adjusted, as needed, to make catalysts having the ratio of components, metal weight percent, slurry wt. %, and other properties. As used herein, a bimodal polymerization catalyst system refers to a catalyst system including a base catalyst and a trim catalyst.

Base Catalyst: A multimodal base polymerization catalyst system was prepared by mixing approximately 11.2 kilograms of a 10% solution by weight of MAO in toluene, approximately 17 kilograms of toluene, and approximately 1.75 kilograms of treated fumed silica (Cabosil TS-610). To this mixture, approximately 68 grams of non-metallocene olefin polymerization catalyst structure supplied by Koei Science Company and 13.3 grams of (pentamethylcyclopentadienyl)(propylcyclopentadienyl)Zr dichloride (available commercially from Boulder Scientific Company) were added. The resulting mixture was introduced into an atomizing device, producing droplets that were then contacted with a hot nitrogen gas stream to evaporate the liquid and form a powder. The powder was separated from the gas mixture in a cyclone separator and collected in a cone can. One kilogram of the solid powder catalyst was charged into an agitated vessel containing 4.0 kilograms of Hydrobrite 380 PO mineral oil from Sonneborne and 0.56 kilograms of ISOPAR-C from ExxonMobil Chemical Company, Houston, Tex. The slurry of was then employed for polymerization reactions, mixing with appropriate trim solution (from Example 1 below) to vary the low molecular weight polymer component, as described in the Examples.

Example 1

The trim solution of Example 1 is a one weight percent solution of (pentamethylcyclopentadienyl)(propylcyclopentadienyl)Zr dimethyl (available commercially from Boulder Scientific Company) in a mixture of a mixture of 86 wt. % Hydrobrite 380 PO Mineral, 10 wt. % ISOPAR-C and 3 wt. % hexane.

Example 1 was performed at the conditions specified in Table 1:

| Example | Initial base catalyst/Trim weight ratio | Reactor temperature (° C.) | ethylene partial pressure ("C2PP") | C6/C2 ratio | H2/C2 ratio | FI (dg/min) | Catalyst Productivity |
|---|---|---|---|---|---|---|---|
| 1 | 3:1 | 100 | 220 | 0.0045 (C6) | 0.0021 | 6.16 | 6518 |

Figure 2:
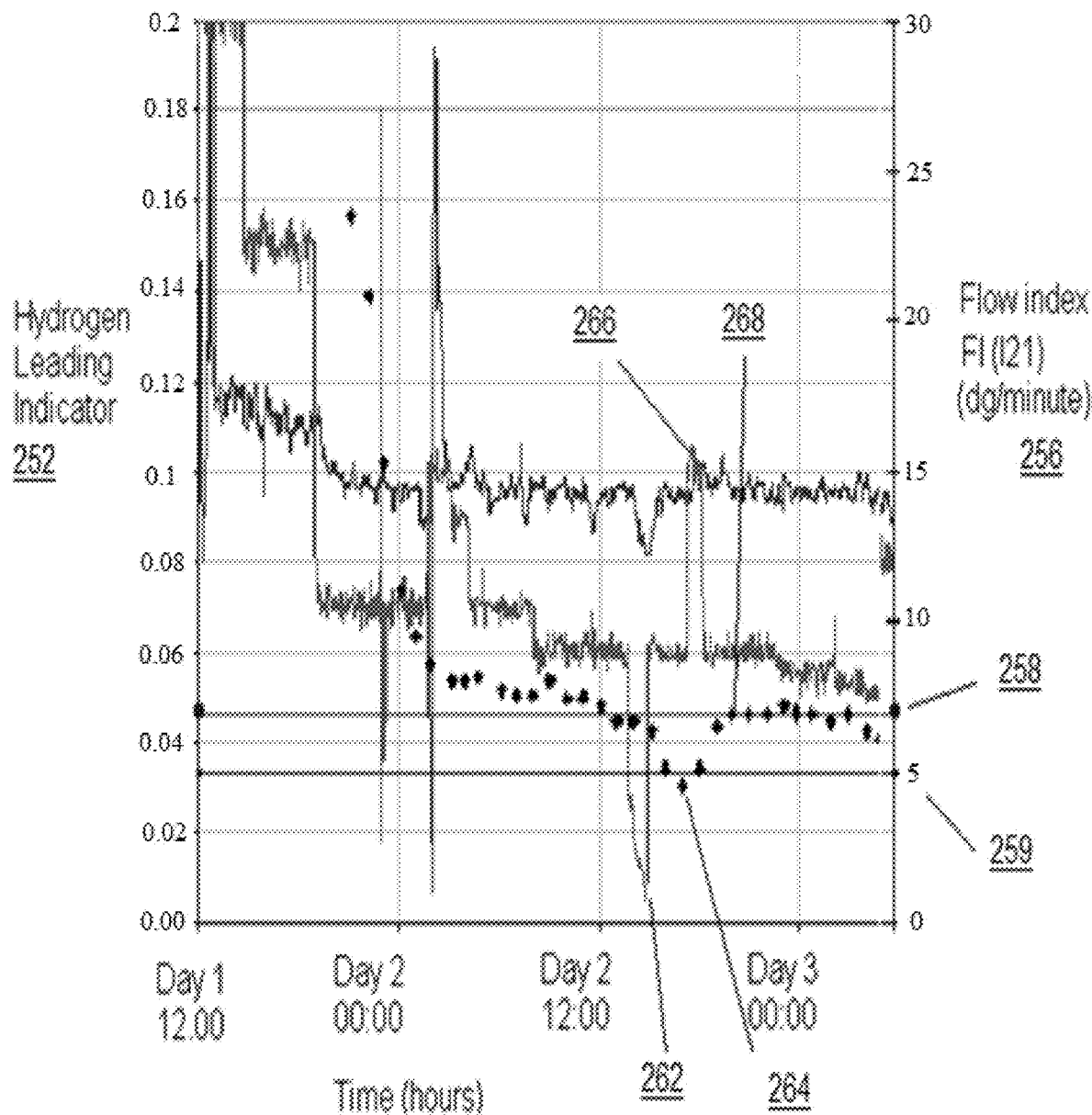
FIG. 2 illustrates a graph of an example of a relationship between a hydrogen leading indicator, a trim catalyst/catalyst feed ratio, and a product parameter in accordance with embodiments described herein.

Resin was produced in accordance with the above conditions and varying amounts of trim/catalyst ratio as described herein with respect to FIG. 2.

FIG. 2 illustrates a graph 250 of an example of a relationship between a hydrogen leading indicator, trim/catalyst feed ratio, and a product parameter in accordance with embodiments described herein. As illustrated in FIG. 2, the graph 250 has a first vertical axis 252 representing an amount of a hydrogen leading indicator present (dimensionless), a horizontal axis 254 representing an amount of time (hours), and a second vertical axis 256 indicating a flow index (FI, I21)(dg/min) as measured during operation of the reactor described herein with respect to the Example 1 and the reactor of FIG. 1.

As noted, an amount of trim catalyst can be altered based on a measured and/or estimated value of a product parameter to alter the value of the product parameter. For example, as illustrated in FIG. 2 the product parameter can be FI (as represented by axis 256). It may be desirably to maintain the value of the product parameter below, above, and/or between a threshold(s). For instance, it may be desirable to maintain the product parameter between a first threshold 208 corresponding to a particular value (e.g., 5 dg/min) of the product parameter and a second threshold 209 corresponding to a particular value (e.g., 7 dg/min), among other possibilities.

As illustrated in FIG. 2, at time 00:00 (e.g., 12 pm) on day 2 a value of the FI is outside (above) a desired range of FI between the first threshold 258 and the second threshold 259. Accordingly, as illustrated at 262 an amount of the trim catalyst is decreased and a corresponding decrease in the FI as illustrated at 264. Similarly, thereafter an amount of the trim catalyst is increased as illustrated at 266 and a corresponding increase in the FI is illustrated at 268. That is, as illustrated in FIG. 2, changes to an amount of a trim catalyst such as an increase in an amount of trim catalyst having corresponding changes (increases) to the hydrogen leading indicator and the FI. In this manner, altering an amount of the trim catalyst based on the leading hydrogen indicator can facilitate control of the product parameter (e.g., FI). For instance, altering an amount of the trim catalyst based on the leading hydrogen indicator can provide supplemental control to account for variance in the product parameter that may not be sufficiently accounted for by a baseline control such as a predetermined equation, among other advantages such as the control of the product parameter without relying on a theoretical linear relationship between the product parameter and the hydrogen leading indicator that may not be accurate under various operating conditions. In this manner, reactor split and FI can be controlled simultaneously as reactor split can be inherently controlled by control of FI.

The disclosure is not limited to the values illustrated in FIG. 2. Rather the values of the axis 252, axis 254, axis 256, the first threshold 258, the second threshold 259, and/or values of the trim catalyst, etc. can be altered to promote aspects described herein and/or depending upon a desired product parameter, etc.

Figure 3:
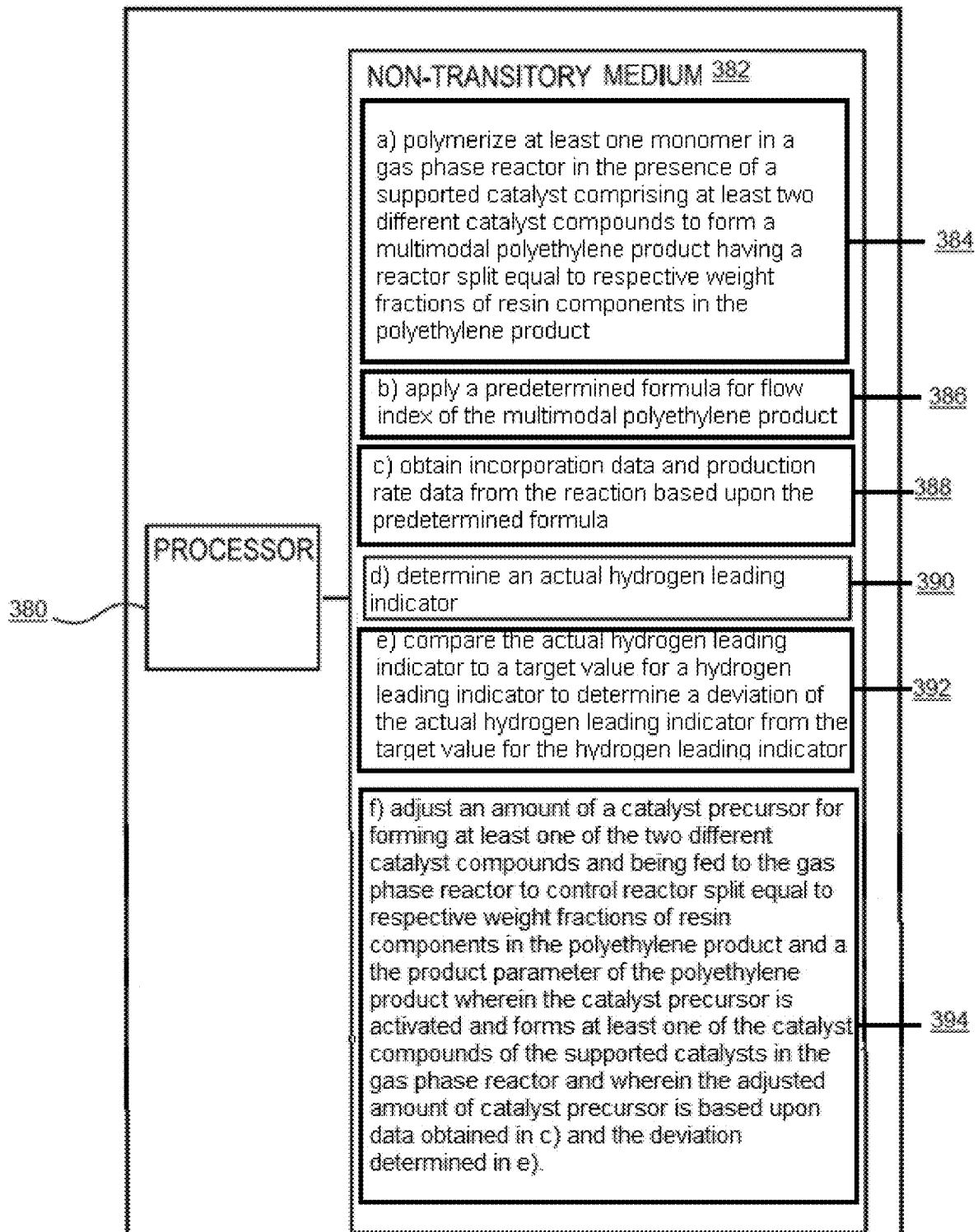
FIG. 3 illustrates a diagram of an example of a non-transitory computer readable medium and processor in accordance with embodiments described herein.

FIG. 3 illustrates a diagram of an example of a non-transitory computer readable medium and processor 380 (i.e., hardware processor) in accordance with embodiments described herein.

The processor 380 may be a central processing unit (CPU), microprocessor, and/or other hardware device suitable for retrieval and execution of instructions such as those stored in memory 382. That is, the processor 380 may execute instructions stored on the non-transitory machine readable medium 382 (i.e., memory).

The non-transitory machine readable medium 382 may be any type of volatile or non-volatile memory or storage, such as random access memory (RAM), flash memory, read-only memory (ROM), storage volumes, a hard disk, or a combination thereof.

The medium 382 may store instructions 384 executable by the processing resource 380 to polymerize at least one monomer in a gas phase reactor in the presence of a supported catalyst comprising at least two different catalyst compounds to form a multimodal polyethylene product having a reactor split equal to respective weight fractions of resin components in the polyethylene product, as described herein. The medium 382 may store instructions 386 executable by the processing resource 380 to apply a predetermined formula for flow index of the multimodal polyethylene product. As mentioned, the predetermined formula can be formula described herein with respect to Equation 2. Applying refers to determination of a FI by using the predetermined formula based on values included in the predetermined formula. In some embodiments, at least some of the values included in the predetermined formula can be determined by analyzing resin produced from a reactor. The medium 382 may store instructions 388 executable by the processing resource 380 to obtain incorporation data and production rate data, as described herein.

The medium 382 may store instructions 390 executable by the processing resource 380 to determine an actual hydrogen leading indicator, as described herein. The medium 382 may store instructions 392 executable by the processing resource 380 to compare the actual hydrogen leading indicator to a target value for a hydrogen leading indicator to determine a deviation of the actual hydrogen leading indicator from the target value for the hydrogen leading indicator. As mentioned, the actual hydrogen leading indicator can be compared to a range of target values for a hydrogen leading indicator such as those values between a first threshold and a second threshold, among other possibilities.

The medium 382 may store instructions 394 executable by the processing resource 380 to adjust an amount of a catalyst precursor for forming at least one of the two different catalyst compounds and being fed to the gas phase reactor equal to respective weight fractions of resin components in the polyethylene product where the catalyst precursor is activated and forms at least one of the catalyst compounds of the supported catalysts in the gas phase reactor and where the adjusted amount of catalyst precursor adjusted is based upon data obtained in c) (i.e., data obtained at least in part from execution of the instructions 388) and the deviation determined in e) (i.e., data obtained at least in part from execution of the instructions 392). Desirably, the data obtained from c) can provide a baseline amount of trim catalyst (e.g., a particular trim catalyst/base catalyst ratio) to operate a reactor while the data from e) can provide a supplemental control in the form of a supplement amount of trim catalyst to adjust (increase or decrease) the baseline amount of trim catalyst. In this manner, unexpected "special" events such as impurity level changes in the gas phase polymerization reactor, variations in trim catalyst such as those due to reactor startup/reactor shut down, and/or variations in chemical amounts/compositions of the trim catalyst/base catalyst, among other special events can be accounted for without analyzing resin produced from a reactor to identify and account for the 'special events' and without relying on a theoretical linear relationship between instantaneous reactor split and the incorporation rate of a particular monomer or reactant.

What is claimed:

1. A method to control reactor split and a product parameter of a polyethylene product in a multimodal polymerization reaction comprising:
   a) polymerizing at least one monomer in a gas phase reactor in the presence of a supported multimodal catalyst system comprising at least two different catalyst compounds to form a multimodal polyethylene product having a reactor split equal to respective weight fractions of resin components in the polyethylene product;
   b) applying a predetermined formula for a product parameter of the multimodal polyethylene product;
   c) obtaining incorporation data and production rate data from the reaction based upon the predetermined formula;
   d) determining an actual hydrogen leading indicator;
   e) comparing the actual hydrogen leading indicator to a target value for a hydrogen leading indicator to determine a deviation of the actual hydrogen leading indicator from the target value for the hydrogen leading indicator; and
   f) adjusting an amount of a catalyst precursor for forming at least one of the two different catalyst compounds and being fed to the gas phase reactor to control reactor split equal to respective weight fractions of resin components in the polyethylene product and the product parameter of the polyethylene product wherein the catalyst precursor is activated and forms at least one of the catalyst compounds of the supported catalysts in the gas phase reactor and wherein the adjusted amount of catalyst precursor is based upon data obtained in c) and the deviation determined in e).

2. The method of claim 1 wherein the catalyst precursor is an unsupported catalyst precursor compound.

3. The method of claim 1, wherein the supported multimodal catalyst comprises at least one metallocene catalyst compound, a Group 15 metal-containing compound, or a combination thereof.

4. The method of claim 1, wherein the multimodal catalyst system comprises two of more of (pentamethylcyclopentadienyl)(propylcyclopentadienyl)$MX_2$, (tetramethylcyclopentadienyl)(propylcyclopentadienyl)$MX_2$, (tetramethylcyclopentadienyl)(butylcyclopentadienyl)$MX_2$, $Me_2Si$(indenyl)$_2MX_2$, $Me_2Si$(tetrahydroindenyl)$_2MX_2$, (n-propyl cyclopentadienyl)$_2MX_2$, (n-butyl cyclopentadienyl)$_2MX_2$, (1-methyl, 3-butyl cyclopentadienyl)$_2MX_2$, $HN(CH_2CH_2N(2,4,6\text{-}Me_3phenyl))_2MX_2$, $HN(CH_2CH_2N(2,3,4,5,6\text{-}Mesphenyl))_2MX_2$, (propyl cyclopentadienyl)(tetramethylcyclopentadienyl)$MX_2$, (butyl cyclopentadienyl)$_2MX_2$, and (propyl cyclopentadienyl)$_2MX_2$, wherein M is zirconium or hafnium, and X is selected from F, Cl, Br, I, Me, benzyl, $CH_2SiMe_3$, $C_2$ to $C_5$ alkyls, and $C_2$ to $C_5$ alkenyls.

5. The method of claim 1, wherein the product parameter is flow index and the predetermined formula is $$\text{Flow Index} = e^{\{A + C[H2_{mol}:C2_{mol}] + D[C6_{mol}:C2_{mol}] + E(ICA_{pp})\}} * (HMW_{mol}:LMW_{mol})^B$$

wherein A is an intercept determined from a best fit line, and B, C, D, and E are slope terms determined from the best fit line, $H2_{mol}:C2_{mol}$ is the molar ratio of hydrogen to ethylene, $C6_{mol}:C2_{mol}$ is the molar ratio of hexene to ethylene, ICApp is the induced condensing agent partial pressure, and $HMW_{mol}:LMW_{mol}$ is the molar ratio of the high molecular weight fraction to the low molecular weight fraction.

6. The method of claim 1, wherein the multimodal polyethylene product is a bimodal polyethylene.

7. The method of claim 1, wherein the hydrogen leading indicator is a H2/C2 flow ratio.

8. The method of claim 1, wherein the hydrogen leading indicator is a H2/C2 flow ratio divided by a H2/C2 molar composition ratio.

9. The method of claim 1, including activating the catalyst precursor by contacting the catalyst precursor with methylaluminoxane in the gas phase reactor.

10. A non-transitory computer-readable storage medium comprising instructions to control reactor split and a product parameter of polyethylene product in a multimodal polymerization reaction that when executed by a processor are to:
   a) polymerize at least one monomer in a gas phase reactor in the presence of a supported catalyst comprising at least two different catalyst compounds to form a multimodal polyethylene product having a reactor split equal to respective weight fractions of resin components in the polyethylene product;
   b) apply a predetermined formula for flow index of the multimodal polyethylene product;
   c) obtain incorporation data and production rate data from the reaction based upon the predetermined formula;
   d) determine an actual hydrogen leading indicator;
   e) compare the actual hydrogen leading indicator to a target value for a hydrogen leading indicator to determine a deviation of the actual hydrogen leading indicator from the target value for the hydrogen leading indicator; and
   f) adjust an amount of a catalyst precursor for forming at least one of the two different catalyst compounds and being fed to the gas phase reactor to control reactor split equal to respective weight fractions of resin components in the polyethylene product and the product parameter of the polyethylene product wherein the catalyst precursor is activated and forms at least one of the catalyst compounds of the supported catalysts in the gas phase reactor and wherein the adjusted amount of catalyst precursor is based upon data obtained in c) and the deviation determined in e).

\* \* \* \* \*